United States Patent [19]
Chacko et al.

[11] 3,833,088
[45] Sept. 3, 1974

[54] SLIDE-RAFT FOR EMERGENCY AIRCRAFT EVACUATION

[75] Inventors: Joseph Nmi Chacko, Corte Madera; Ronald H. Day, Mill Valley; Robert S. Satterfield, Pleasant Hill, all of Calif.

[73] Assignee: Sargent Industries, Inc., Los Angeles, Calif.

[22] Filed: Oct. 18, 1972

[21] Appl. No.: 298,563

[52] U.S. Cl.......................... 182/48, 182/48, 193/25
[51] Int. Cl......................... A62b 1/20, B65g 11/10
[58] Field of Search ... 182/48; 9/11 A, 2 A, DIG. 2; 193/25; 244/137

[56] References Cited
UNITED STATES PATENTS

| | | | |
|---|---|---|---|
| 3,034,154 | 5/1962 | Silvertone | 9/11 A |
| 3,092,854 | 6/1963 | Manhart | 9/11 A |
| 3,433,342 | 3/1969 | Switlik | 193/25 B |
| 3,458,009 | 7/1969 | Favors | 182/48 |
| 3,679,025 | 7/1972 | Rummel | 182/48 |

FOREIGN PATENTS OR APPLICATIONS

| | | | |
|---|---|---|---|
| 1,204,341 | 9/1970 | Great Britain | 182/48 |

*Primary Examiner*—Reinaldo P. Machado
*Attorney, Agent, or Firm*—Smyth, Roston & Pavitt

[57] ABSTRACT

An evacuation device which inflates automatically upon opening of the door of an aircraft unless predetermined actions are accomplished before the door is opened. The device comprises individually operable and pneumatically distinct upper and lower inflation tube assemblies which support a slide surface therebetween across which persons jumping from the aircraft may slide to ground level. A canopy is provided which may be fastened across the slide surface so that the device can be utilized as a raft in an aircraft ditching situation. If desired, the capacity of the raft can be increased by the provision of sponsons integral with each of the inflatable tube assemblies and extending laterally therefrom.

27 Claims, 12 Drawing Figures

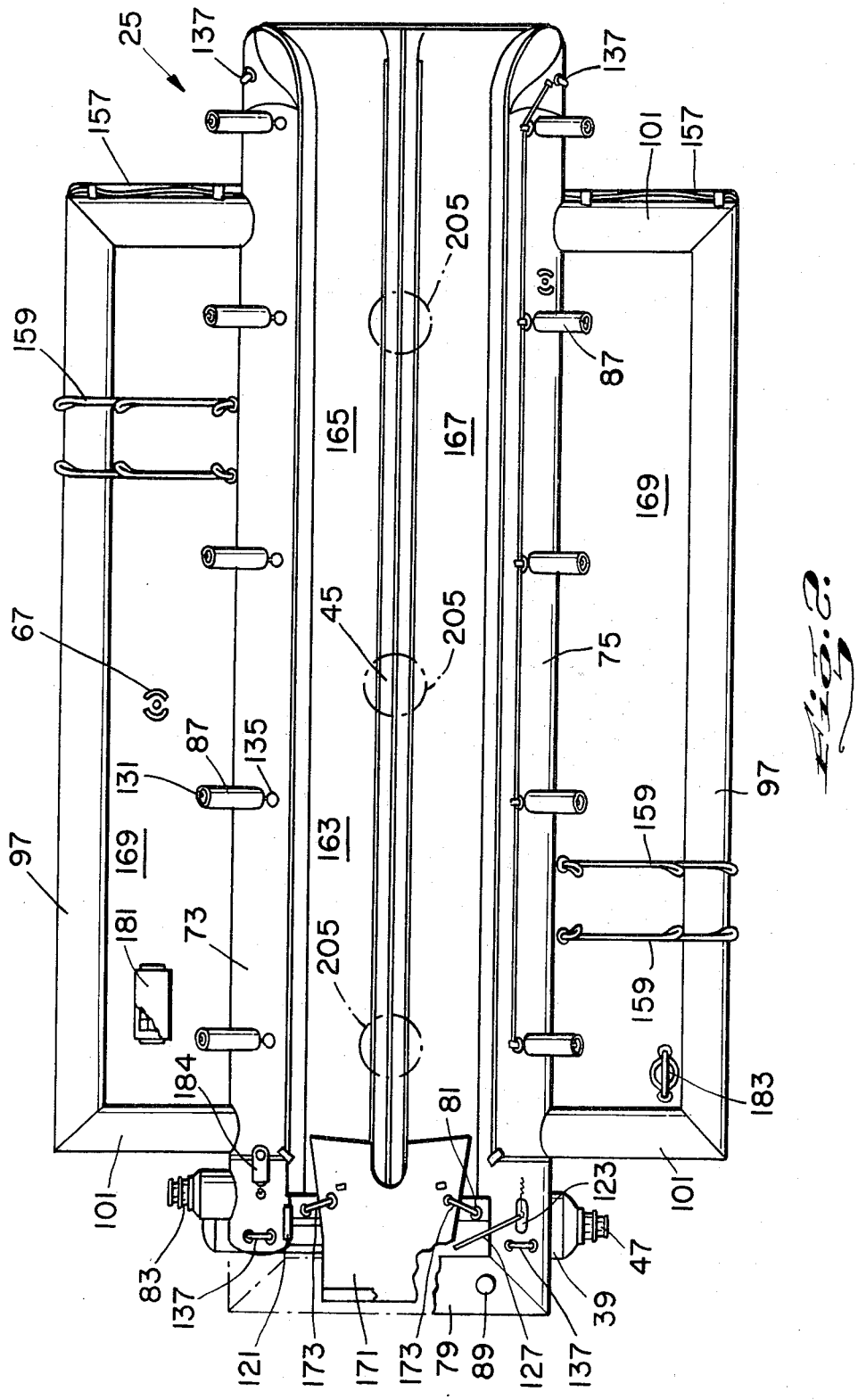

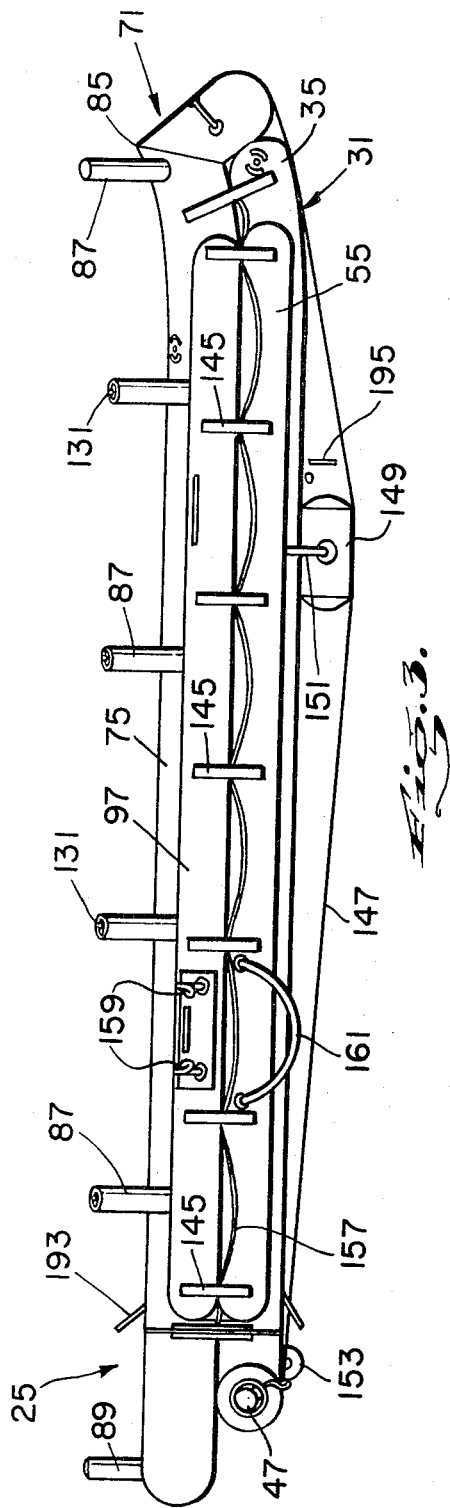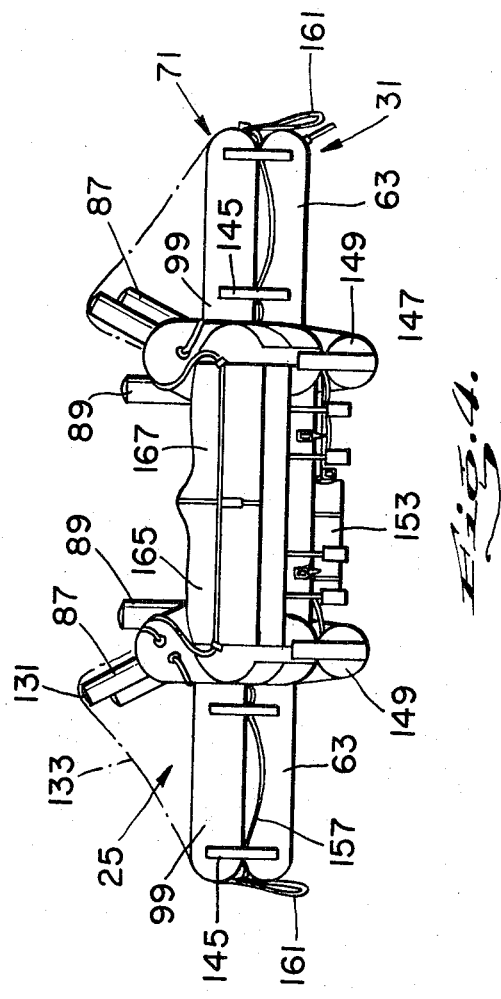

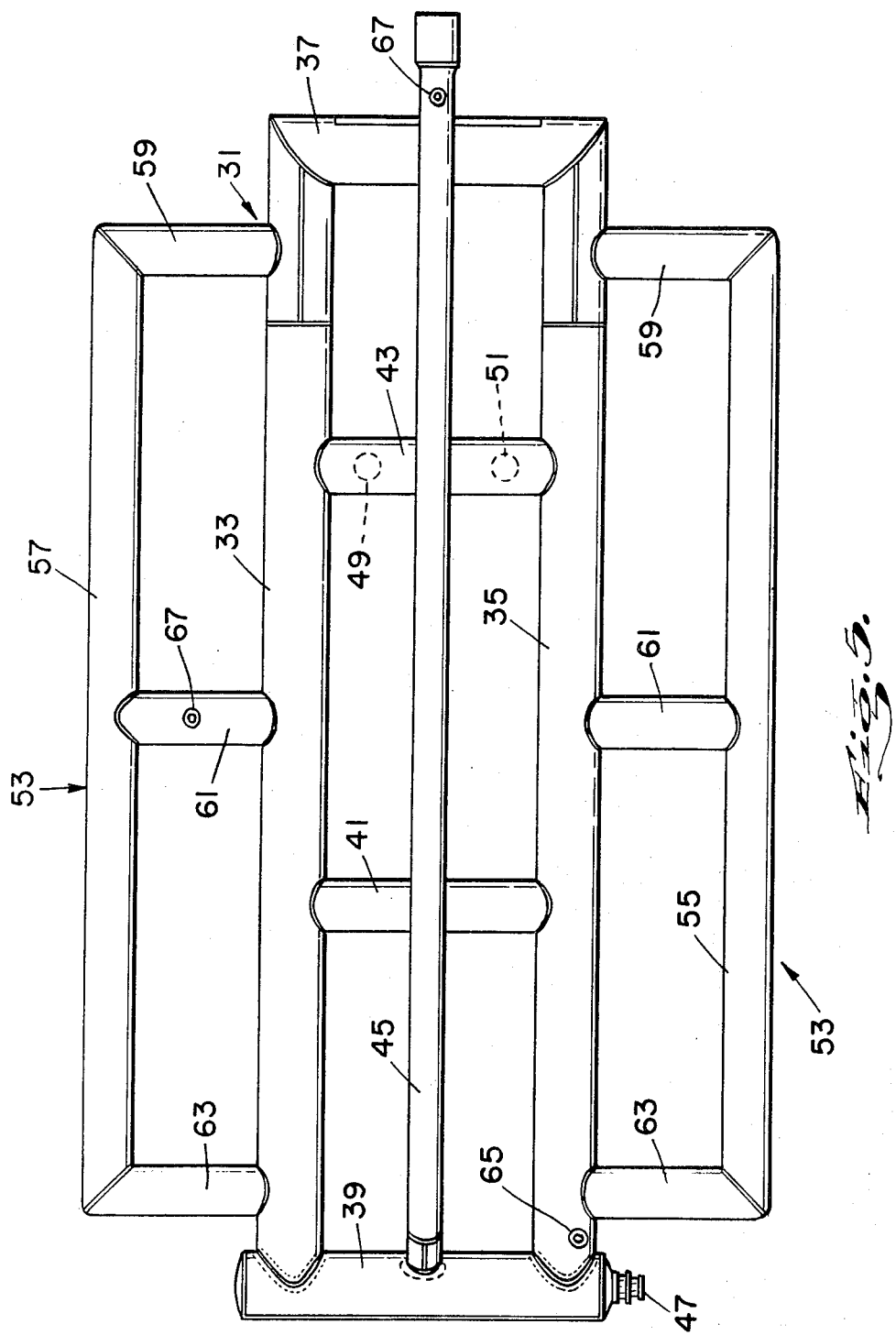

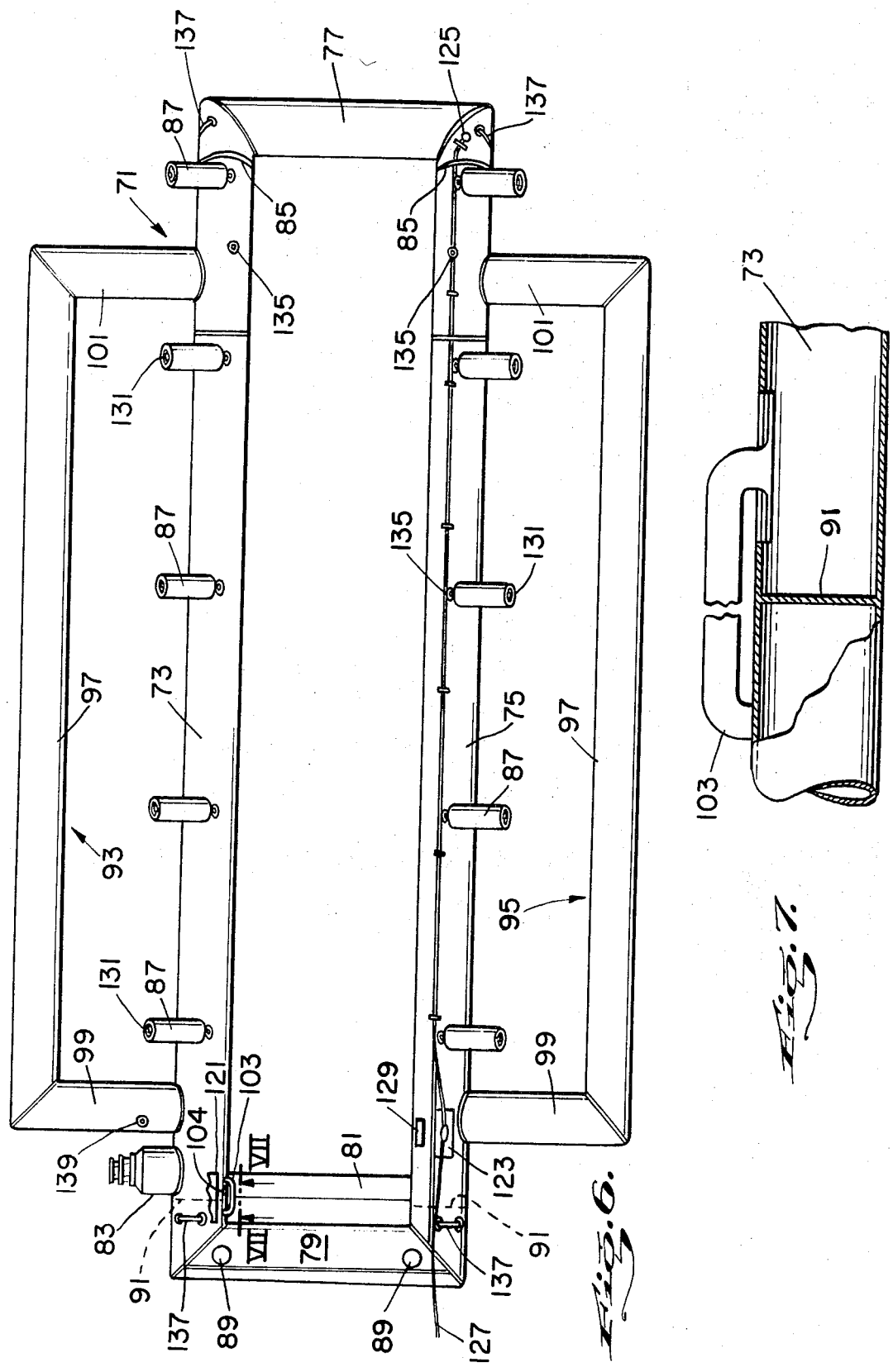

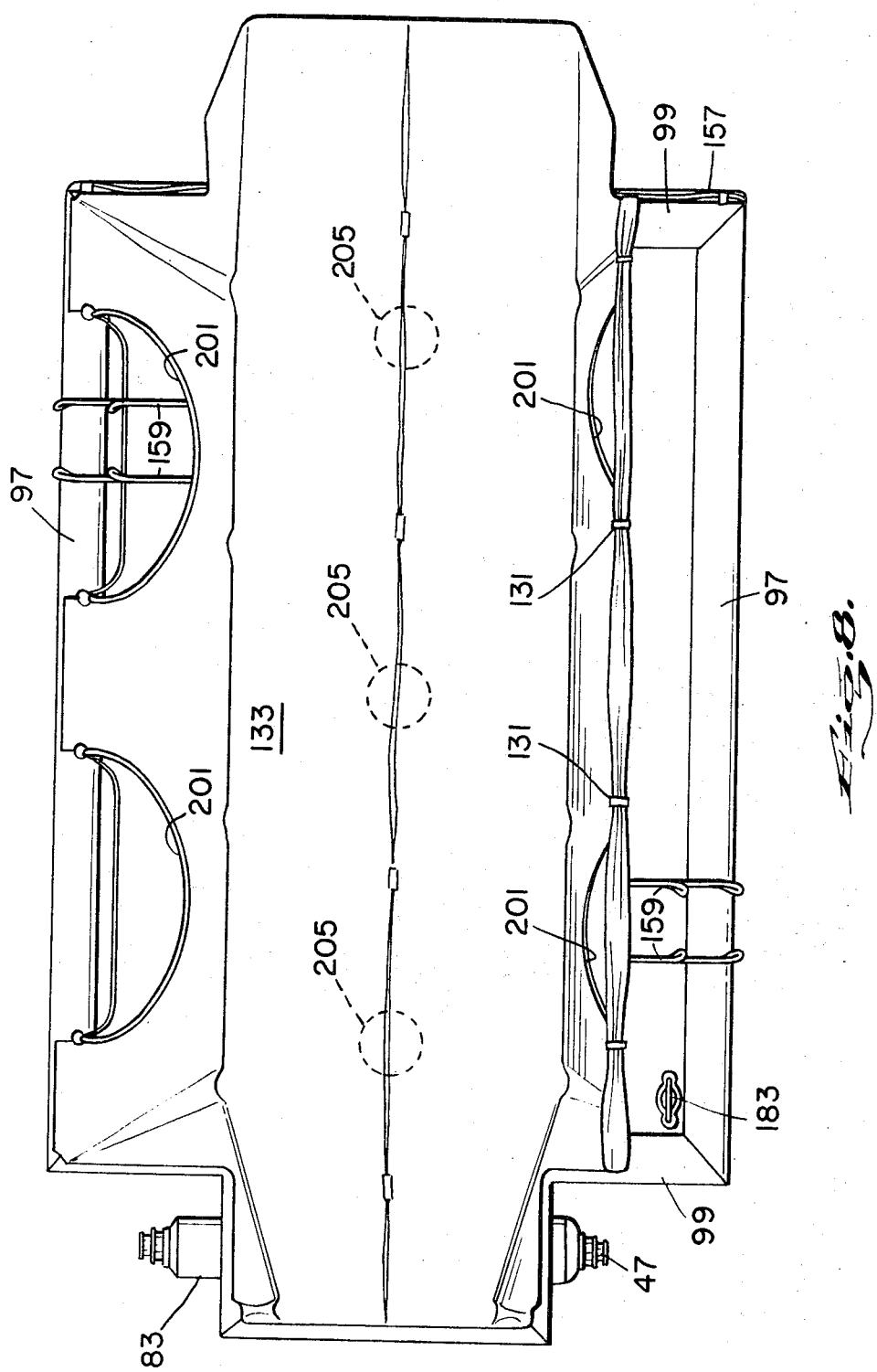

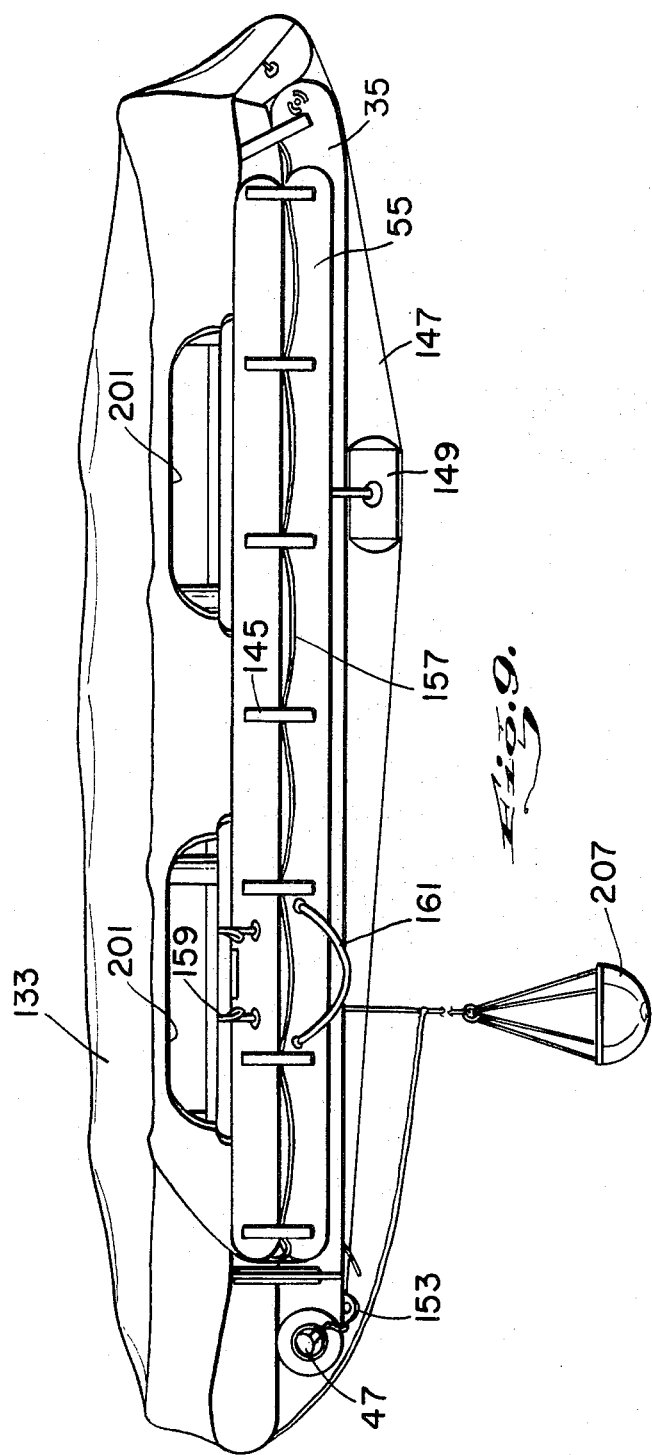

SLIDE-RAFT FOR EMERGENCY AIRCRAFT EVACUATION

BACKGROUND OF THE INVENTION

When an aircraft lands under conditions in which no passenger evacuation service is available, such as when it is force-landed or "ditched," escape apparatus must be provided so that passenger and crew evacuation can be safely accomplished in a relatively short period of time. In fact, government aircraft safety regulations require that apparatus be provided so that all passengers and crew members can be evacuated from a downed plane within a relatively short period, such as 90 seconds.

In addition to being a safety problem, this requirement also becomes an economic problem since the regulations specify that the number of people that can be evacuated during the regulated time period is the maximum number to be carried by the aircraft at any time. Thus, the evacuation safety loading capacity of the aircraft limits the number of passengers which may be carried in an airplane even though more passengers could be accommodated in the aircraft, in an otherwise safe manner, without violating load limits, etc.

Obviously, even if an aircraft is provided with a built-in stairway, it is desirable to provide some apparatus by means of which passengers can be evacuated at a greater rate than that possible by normal deplaning methods. Therefore, it has become common to supply a slide which extends from each of the normal and/or emergency exits of the aircraft to provide an easy means of escape from the exits which, under normal forced landing conditions, are elevated above the ground. In use, an evacuee walks to the door of the aircraft, jumps onto the slide, and slides down to the ground.

In copending application Ser. No. 131,270, filed Apr. 5, 1971, now U.S. Pat. No. 3,712,417 assigned to the Assignee hereof, and entitled INFLATABLE EVACUATION SLIDE, a novel slide apparatus is disclosed which accomplishes the necessary functions of an emergency evacuation device.

As disclosed there, such evacuation devices or slides are normally carefully folded and stored in cases which are mounted on the door of the aircraft so that a locking bar may be fastened to the floor of the craft when the door is closed. If the bar is not detached before the door is opened, the locking bar tends to pull the device from the case and/or open the case in such a way that the device is inflated automatically. Automatic inflation, which occurs whenever the door is opened unless the bar is detached from the floor, serves to reduce the amount of time necessary for evacuating the aircraft since it eliminates the additional step of manually causing the raft to inflate after the door has been opened.

Previously developed slides, including the one disclosed in the aforesaid application, may also be suitable for use as auxiliary flotation devices if the aircraft should be ditched over water. These life raft-type devices are not life rafts in the strict sense of the term since they provide no protective cover for the occupants, nor do they provide any emergency rations, etc.

Present government regulations concerning the overwater flight of commercial aircraft at altitudes less than those necessary to permit a safe glide to an emergency landing on land require that rafts be provided to accommodate all of the passengers and crewmembers aboard for use in a ditching situation. For example, if a commercial aircraft should travel across an ocean, it is required to provide life rafts in sufficient quantities so that all of the occupants of the craft can be evacuated into a raft safely. Each such raft is required to provide sufficient structure to protect the occupants from exposure and sufficient rations and equipment to supply them until a search and rescue operation can be successfully concluded.

Since auxiliary flotation devices as disclosed in the aforesaid application do not provide these capabilities, even though they are sufficiently buoyant to act as auxiliary devices, commercial aircraft operators of overwater flights have been required to provide not only emergency evacuation slides, but also life rafts in sufficient quantities to accommodate all passengers and crewmembers.

Thus, the present state of the art requires that the aircraft used on such flights be provided with inflatable slide devices and inflatable life rafts. Since the slide devices are located at the doors of the aircraft, other storage space must be provided for the rafts. In most cases, the life rafts are stored in the overhead ceiling of the aircraft and, when the ditching process begins, certain panels in the overhead can be moved away and the rafts removed. The rafts are then carried to the doors of the aircraft, thrown out, and then inflated. This procedure is cumbersome since the rafts are heavy and bulky; they are difficult to move through an airplane compartment, particularly when there is even a slight degree of panic amongst the aircraft occupants. Further, this technique is very slow and reduces the time available for the occupants to get into the rafts prior to the time that the airplane sinks.

Consequently, it has become both desirable and necessary to provide some means by which rafts may be more readily accessible to the aircraft occupants so that evacuation can occur at a faster rate.

SUMMARY OF THE INVENTION

The present invention relates to an emergency evacuation device which may be utilized as either a slide or a raft, as the latter is construed under government regulations relating to aircraft flotation equipment. More particularly, the invention relates to a unitary device which may be utilized as a slide in one mode of usage and as a raft in another mode of usage.

Still more specifically, the invention relates to a slide-raft which is formed as a single unit and which may be stored in a case mounted on an aircraft door in a manner similar to that in which presently utilized slides are mounted. In one preferred embodiment, the invention comprises a pair of vertically spaced, pneumatically separated inflatable tube assemblies which are suitably bound together so as to be maintained in a fixed relationship. A relatively slippery surface may be located at approximately the interface or plane of abutment of the inflatable tube assemblies to act as a slide when the device extends from the aircraft in an on-land situation.

On the other hand, when the device is used in a ditching situation in the water, the slide surface may serve as a raft floor for the support of personnel riding on the raft. The upper inflatable tube assembly then acts as a wall of the raft which will prevent passengers from falling off the sides of the raft. The provision of two separately inflatable tube structures increases the safety of the raft since damage to one of the tube structures will not effect the other. Since the assemblies are vertically spaced, if one is damaged or otherwise deflated, the other will still hold the occupants out of the water.

The two tube assemblies may be so arranged that a person using the slide is brought to a nearly upright position just before he reaches the ground. Since he is nearly upright, he can get away from the bottom of the slide quickly to clear it for the next user. In this way, the possibility of injury is nearly eliminated since each user lands on his feet and his momentum carries him forward several steps at a slow running pace. This is accomplished by suitably arranging the two tube assemblies in the manner taught in the above-cited application Ser. No. 131,270.

When the device is used as a raft, it is oriented in a substantially horizontal position relative to the surface of the water and the slide surface will serve as a support for people walking, sitting, reclining, etc., thereon. In this position, the relative arrangement of the tube assemblies, which brings users to the upright position in the slide mode, will prevent people falling off the raft at that end.

On the other hand, none of the structure in either tube assembly will accomplish the same result at the head end of the raft, i.e., that end initially secured to the airplane. In order to accomplish this result, a device formed in accordance with the present invention may be structured so that the upper tube assembly may be selectively rigged to do the job.

In one preferred embodiment, a head end tube may be formed integral with the upper tube assembly but be pneumatically segregated therefrom by internal walls or bulkheads. This head end structure may be stored under the girt of the slide-raft so that it is not in the way or susceptible to damage when the slide is being used or the raft is being boarded.

When the head end tube is to be inflated after the raft has been boarded, the girt may be moved out of the way and a supply of air injected into the tube by a separate pump or by connecting it pneumatically to the remainder of the upper tube assembly by an air bypass line. In other words, a normally closed bypass line connecting the head end tube to the remainder of the upper tube assembly may then be opened to allow an equalization of air pressure throughout the entire upper tube assembly including the head end tube.

In addition to blocking off the head end of the raft, this latter-described method of inflation will also serve to reduce the stiffness of the raft and provide a more comfortable ride for its occupants.

The device may be provided with a canopy which is sealed to the upper tube assembly along the sides thereof; such sealing will prevent the entry of water between the canopy and the tubes. When the device is to be used as a raft, the canopy may be pulled across and fastened at the center of the raft to form a roof or tent to protect the occupants from exposure.

When a device employing the concepts of the present invention is utilized, one complete emergency evacuation package may be provided in the case on the aircraft door. Consequently, the device can be utilized whether the aircraft is crash-landed (on land) or ditched (in water) since merely opening the door with the locking bar attached to the aircraft will cause the device to extend out from the aircraft and be inflated.

Once the door is opened, the ability of the people on the aircraft to survive is vastly improved in either type of emergency situation since the structure which is normally required only for a raft will strengthen the device when it is used as a slide, but it will be immediately and readily available when a raft is required.

Experimentation has determined that the provision of the evacuation structure with facilities to act as either a slide or raft increases the volume of the device when folded only about 40 percent over the volume of the prior art auxiliary flotation devices. On the other hand, 100 percent of the volume of the prior art rafts, usually stored in the cabin overhead, is completely eliminated. In other words, the use of a single structure to accomplish both results achieves a reduction in weight, volume, and total cost since the requirement for the provision of a separate raft is eliminated. Further, the logistics problems involved with providing and maintaining such emergency equipment are thus significantly reduced. Even more important, there is no need to undertake the difficult task to get at, throw out, and expand a raft after the aircraft is actually in the water since it will be immediately available when the door is opened.

The elimination of the raft storage from the cabin overhead also aids the designer since it changes the location of the aircraft center of gravity to some extent. In turn, this may allow the plane to be designed with overhead storage for carry-on baggage, thus increasing passenger convenience and satisfaction.

In the preferred embodiment of the invention, the device may be provided with inflatable stanchions which serve to support the canopy and hold it above the people riding in the raft, increasing their comfort and providing additional room for moving about.

If desired, a pair of U-shaped sponson assemblies may be extended from each side of the raft, pneumatically integral with each of the inflatable tube assemblies, in order to provide additional raft capacity. The raft canopy can be sealed to the sponson tubing in order to provide coverage for the increased raft area. The addition of sponsons to the raft not only increases the capacity of the raft for carriage of evacuees, but also increases stability since the width of the raft is increased and the possibility of capsizing is proportionately reduced.

Any necessary or desirable survival equipment may be suitably attached to the raft at predetermined locations. For example, food rations and water purification equipment can be provided in small flat pockets in the sponson flooring or in any other suitable location. Additionally, the device can be provided with a sea anchor which, when extended from the raft, will cause the raft to be turned into the wind in order to increase the comfort of the occupants.

Various other features and advantages of evacuation devices formed in accordance with the present invention will be explained and will become apparent to those skilled in the art upon perusal of the following detailed description of one embodiment of the invention, taken together with the accompanying drawings. It will be realized that a wide variety of structures may be conceived and designed which utilize the present invention without exceeding the scope thereof as defined in the appended claims.

BRIEF DESCRIPTION OF THE DRAWINGS

FIG. 2 comprises a top plan view, with various structural elements broken away, of the preferred embodiment of the present invention when used as either a slide or a raft;

FIG. 3 comprises a side elevation of the device shown in FIG. 2;

FIG. 4 comprises an end elevation of the device shown in FIG. 2;

FIGS. 5 and 6 comprise plan view illustrations of the lower and upper inflatable tube assemblies, respectively;

FIG. 7 comprises an enlarged partial elevation view of a portion of the structure utilized to inflate the head-end enclosure tube when the device is to be used as a raft;

FIGS. 8 and 9 comprise top plan and side elevation views, respectively, similar to FIGS. 2 and 3, illustrating the canopy in the closed mode to protect the occupants of the raft, and the sea anchor extended in FIG. 9;

DETAILED DESCRIPTION

Figure 1:
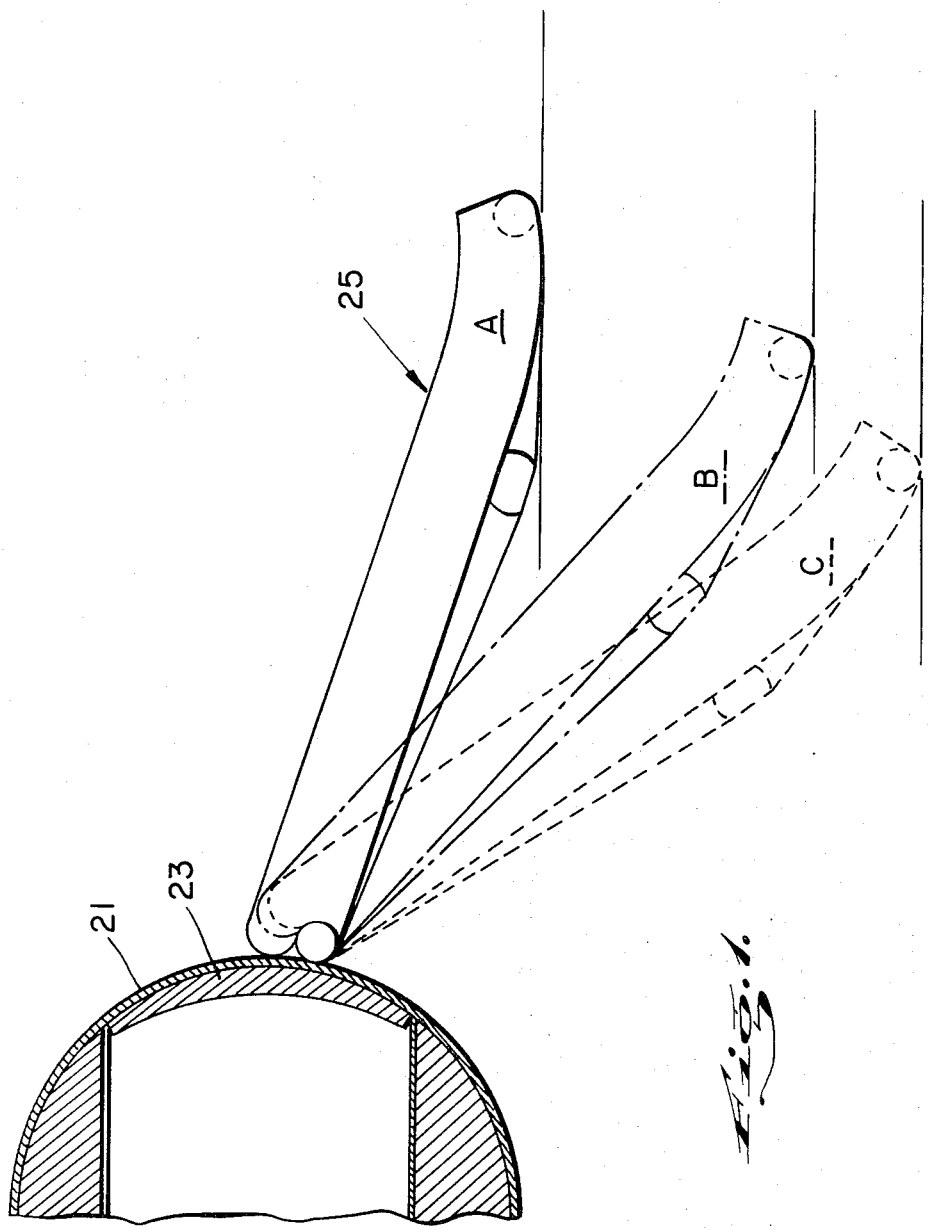
FIG. 1 is a schematic side elevation, partly in section, illustrating various positions in which the evacuation device might be used as a slide during an emergency.

Referring now to FIG. 1, there is depicted, in section, an aircraft hull 21, having an opening 23 therein which may, for the purposes of illustration, be considered to be a rear opening, near the tail, in a large aircraft of the modern type currently referred to as "jumbo jets." A slide, generally designated at 25, has been illustrated in three distinct positions labeled A, B, and C.

Normally, the slide would be deflated and carefully folded and packed within a case which would be suspended from the inside of the door of the aircraft at opening 23. A locking bar (not shown) extending from the bottom of the case would be fastened to the floor of the aircraft. If the door is opened before the locking bar is detached, the case will be opened and the slide automatically ejected from the aircraft and inflated by any well-known aspirator system which may be provided as a part of the evacuation device.

FIG. 1 serves to schematically illustrate various positions which the slide-raft might assume as a result of various aircraft configurations following a crash landing. For example, if the pilot lands the aircraft in a belly landing with no gear extended, when the rear door is opened the slide will assume angle of the position labeled A. If the aircraft lands with the gear properly extended but some emergency required that the slide be used for evacuation of passengers and crew, the slide would extend into the angle of the position illustrated at B. If the aircraft lands with the main landing gear extended but with the nose gear completely collapsed due to a failure, the inflated slide would assume the angle of the position illustrated at C. Thus, it can be seen that a properly designed evacuation device in accordance with the present invention can be utilized to evacuate the aircraft regardless of the landed configuration thereof. It will also be realized by those skilled in the art that if the aircraft is ditched into the sea, the slide will assume a position similar to that at A and will travel toward a horizontal position as the aircraft sinks.

It should be borne in mind throughout the following discussion that the safety device embodying the present invention, as will be described, serves not only as a slide, such as illustrated schematically in FIG. 1, but also as a raft which may be utilized in a substantially horizontal orientation for the carriage and protection of its occupants. When the door of the aircraft is opened with the locking bar in its retained position within the aircraft, the safety device will immediately begin to inflate and its inflation will be completed within a matter of seconds. Thus, regardless of the situation in which the aircraft is downed, the safety device will be almost instantaneously ready and available for use by the occupants of the craft. It will be unnecessary, in a ditching situation, for the occupants to partially disassemble the cabin structure, obtain a raft, eject it from the craft, and then cause it to be inflated since this will already have been accomplished by the present invention.

Inflation of the slide-raft may be accomplished by any of a variety of well known inflation devices, normally comprising pressurized gas-actuated aspirators which, per se, do not form a portion of this invention. An example of such an inflation device has been shown, for example, in U.S. Pat. No. 3,572,974.

Referring now to FIG. 5, there is shown a plan view of a lower inflation tube assembly 31 which may be formed as a complete and pneumatically distinct assembly and which forms the lower part of the slide-raft. In brief, the assembly 31 may comprise a pair of opposed, elongated tubes 33 and 35 which are pneumatically connected by a lower end cross tube 37, an upper end cross tube 39, and intermediate cross tubes 41 and 43. The intermediate cross tubes may be of any number and may be located at suitable positions according to the length of the tubes 33 and 35. Additionally, a central divider tube 45 may be connected to and in pneumatic communication with the upper end cross tube 39 and located so that it may rest upon and/or be bonded to the upper surfaces of the cross tubes 37, 41, and 43, for a purpose to be described.

An aspirator 47 of any well-known type, such as those described above, may be located at one side of the upper end cross tube 39 and pneumatically connected to a pressurized gas bottle (not shown in this figure) for inflation of the lower tube assembly 31 when the inflation system is properly triggered. This can occur, for example, when the door of the aircraft is opened during a time in which a locking bar (not shown) is secured to the floor of the aircraft in order to trigger the inflation system. Thus, when the trigger is actuated, the aspirator 47 will cause air under pressure to enter into the upper end cross tube 39 and travel along the lengths of the side tubes 33 and 35. As this occurs, the air will also inflate the intermediate cross tubes 41 and 43 and the divider tube 45.

If desired, one or more suitable tie-back assemblies 49 and 51 may be provided to control the extension of the tube assembly. Such tie-back assemblies have been clearly illustrated and described in U.S. patent application Ser. No. 131,270 filed Apr. 5, 1971 and assigned to the Assignee hereof. Although the specific configuration of the tie-back assembly is not important here, when the device is folded into the case which is mounted on the inside of the airplane door, the lower end thereof may be, in over-simplified terms, attached to the upper end by means of the tie-back devices 49 and 51. As the device is inflated, a stress is generated causing the tie-back assemblies to become separated from their locking devices (not shown). The forces exerted by the tie-backs are very carefully calculated so that they will not separate until a predetermined force is exerted thereon, at which time a large percentage of the inflation of the tube system will have been accomplished.

When the tie-back assemblies separate, the slide-raft will open to one of the positions illustrated in FIG. 1. Any further inflation will continue at a very rapid rate so that, when the lower cross end tube 37 contacts the ground, substantially all of the inflation will have been accomplished and, when used as a slide, the device will be prevented from attaining a position in which it is wedged beneath the airplane and is thus useless.

In some embodiments of the device, the lower inflation tube assembly will be formed in substantially the manner described above and no other inflatable structure will be associated therewith for inflation by the aspirator 47. For example, when the slide-raft is to be utilized at an aircraft exit from which it is calculated only a certain, relatively small number of passengers and crewmembers will depart, no additional structure need be utilized. In any event, when the device is used as a slide, no other structure, for the assembly 31, is needed, although it may be helpful to strengthen the slide.

In other embodiments, when the assembly 31 is to be utilized as a raft by a larger number of people, a pair of sponson sections 53 and 55 may be employed. Each such sponson section may comprise an elongated side tube 57, a lower cross tube 59, one or more intermediate cross tubes 61, and an upper end cross tube 63.

In operation, when the trigger is actuated, aspirator 47 will cause a charge of compressed air to be injected into the upper end cross tube 39. The air will travel along the lengths of the side tubes 33 and 35 and the central divider tube 45. It will also travel through the sponson section cross tubes 63, 61, and 59 to cause their inflation as well as the inflation of the side tubes 57. In this manner, the lower inflation tube assembly 31 will become completely inflated to support a flexible surface which will be described later. If desired, a pressure release valve 65 and inflate-deflate valves 67 may be located at suitable positions in the inflation tube assembly to allow the evacuation of some of the air therein if the assembly should become too stiff and rigid when acting as a raft. Similarly, if the air should escape through a small leak in the assembly, additional air can be added through the valve 67.

Refering now to FIG. 6, an upper inflatable tube assembly 71 is illustrated and may comprise a pair of elongated side tubes 73 and 75 which may be joined at the lower end by a cross tube 77 and at the upper end by a head end tube 79. The side tubes 73 and 75 may also be placed in communication by an upper end cross tube 81 so that air, force into the assembly 71 by an aspirator 83, will enter the side tube 73 and travel therealong and will also enter the cross tube 81 to travel through the side tube 75.

The device illustrated herein is formed so that there is a small bend portion at the location designated 85 on each of the side tubes 73 and 75 so that when used as a slide, the lower cross tube 77 will rest upon the ground and support the slide-raft relative thereto. The lower end tube 37 of lower tube assembly fits up into the crotch of this bend, as illustrated in FIG. 3. This relationship causes a person using the slide to leave it in an upright, running position as disclosed in said application Ser. No. 131,270.

Along each of the side tubes 73 and 75, a plurality of integral stanchions 87 may be suitably located at angles, such as illustrated in FIG. 4, to support a canopy or cover which will be described later. Similarly, a pair of stanchions 89 may be formed integral with the head end tube 79 for support of the canopy. Thus, when air enters the upper assembly 71 through the aspirator 83, it will travel through the cross tube 81 and the side tubes 73 and 75 so that these three tubes, the lower cross tube 77, and the upright stanchions 87 become inflated.

In order to prevent the head end tube 79 from interfering with the people jumping onto the slide or walking onto the raft, each of the side tubes 73 and 75 may be provided with an interior bulkhead or wall 91 which prevents air within the upper assembly 71 from passing into the head end tube 79 and its related stanchions 89. Thus, when the device is attached to the aircraft, the head end cross tube and its stanchions are out of the way and not obstructing the movement of the aircraft occupants as they leave either by way of sliding when the aircraft is on land or walking when it has been ditched.

As described relative to the lower inflatable tube assembly, if only a few passengers are expected to board the raft from certain positions within the aircraft, no sponson sections are needed. However, when the device is to be utilized with a larger number of passengers, a pair of sponson sections 93 and 95 may be provided in pneumatic communication with the side tubes 73 and 75, respectively. As illustrated, each of the sponson sections 93 and 95 comprise a side tube 97, an upper cross tube 99, and a lower cross tube 101. Thus, when the upper inflatable tube assembly 71 is inflated as previously described, the sponson sections 93 and 95 will be inflated simultaneously with the remainder of the structure.

When the slide-raft is used in the raft mode and is fully loaded, it may be detached from the aircraft by any suitable means such as those illustrated in the previously cited copending application Ser. No. 131,270. When it is thus separated, the cooperation of lower end tubes 37 and 77 will prevent people from falling overboard at the outer end. However, the head end which was attached to the aircraft is not provided with any structure which will lock off the head end of the raft and prevent passengers from falling overboard there. Consequently, structure may be provided to allow the inflation of the head end tube 79 and its related stanchions 89 after the passengers are aboard the raft. Although a device such as an aspirator or a hand pump may be used to accomplish the inflation, in the preferred embodiment. inflation may be accomplished by bleeding a portion of the air in the inflated upper tube assembly 71 through a feed tube 103. As seen in FIG. 7, the feed tube 103 may connect the portions of the side tube 73 on either side of the bulkhead 91 so that air in the tube to the right of the bulkhead, as seen in the drawings, may travel through the feed tube to the left of the bulkhead and into the head end tube 79; thus, pressure on the opposite sides of the walls 91 is equalized. As an advantage of this method, this redistribution of air will relax the rigidity of the raft slightly, making it easier to ride.

Figure 11:
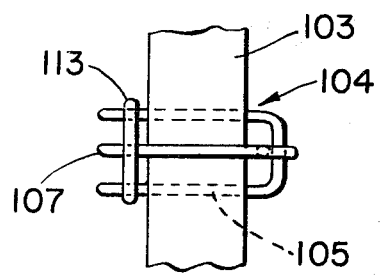
FIGS. 11 and 12 comprise top plan and side elevation views, respectively, of structure which may be utilized to choke off the head-end tube expansion structure illustrated in FIG. 7.
Figure 12:
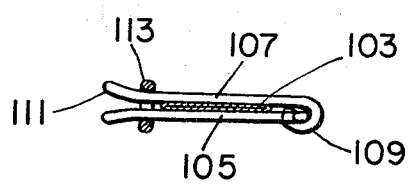

Any suitable means may be utilized to pinch off the feed tube 103 until such time as the head end tube is to be inflated. For example, an assembly 104 such as shown in FIGS. 11 and 12, may comprise a U-shaped pin 105 having a single-legged pin 107 fastened thereto by bending one end of the pin 107 into a closed configuration 109 which is positioned at the bottom of the U. The other end of the pin 107 may be provided with an angled portion 111 as illustrated in FIG. 12.

In use, the pin 105 may be placed on one side of the tube 103 and the pin 107 placed on the opposite side thereof. The pins may be brought together in a safety pin-like action to the relative positions illustrated in FIG. 12. Then, an oval or oblong continuous pin or ring 113 may be placed over the ends of the pins 105 and 107 in the manner shown. Thus, the tube 103 can be pinched off and air cannot travel from one side of the bulkhead 91 to the other. When the raft has been detached from the plane, the ring 113 may be pulled away from the pins 105 and 107 which will then separate and allow air to freely communicate through the feed tube 103 to equalize pressure on the opposite sides of the bulkhead 91. As stated above, this feature of the invention also provides the additonal advantage of allowing the relatively stiff upper inflatable tube assembly 71, which stiffness is desirable in the slide mode, to become somewhat less rigid. Thus, the device, when used as a raft, will be more flexible and less uncomfortable to ride in.

In order to control the inflatable assembly pressure, and even as with the lower inflatable tube assembly 31, suitable inflate-deflate valves 139 may be located in one or more locations on the upper tube assembly 71.

In order to prevent the assembly 104 from puncturing any of the inflatable tubes when the device is folded and placed into the case on the inner side of the aircraft door, a suitable cover patch 121 may be provided with any suitable means, such as Velcro strips, which temporarily attach the patch 121 at both sides thereof to the side tube 73. Thus, the assembly 104 is covered until necessary to release it.

If desired, suitable patches 123 and 125 may be attached to either or both of the tubes 73 and 75 so that a static line 127 may be connected between the raft and the aircraft after the raft has been otherwise detached therefrom. Alternatively, the static line may be used to attach several rafts together in order to increase the likelihood of survival. When it is necessary to sever the static line 127, a hooked knife may be provided within a pocket 129 formed near one end of the assembly so that it may be reached very quickly by the person who will sever the line.

Similarly, each of the stanchions 87 may be provided with a loop patch 131 to which the canopy 133 (FIG. 4) may be attached; snap-patches 135 may be located on the side tubes 73 and 75 also to hold the canopy. At either end of the side tubes, a Velcro-type patch 137 may be provided so that the canopy may be suitably folded and held until such time as the sides thereof are to be drawn across and connected at the center of the device to form a tent-like enclosure.

Figure 10:
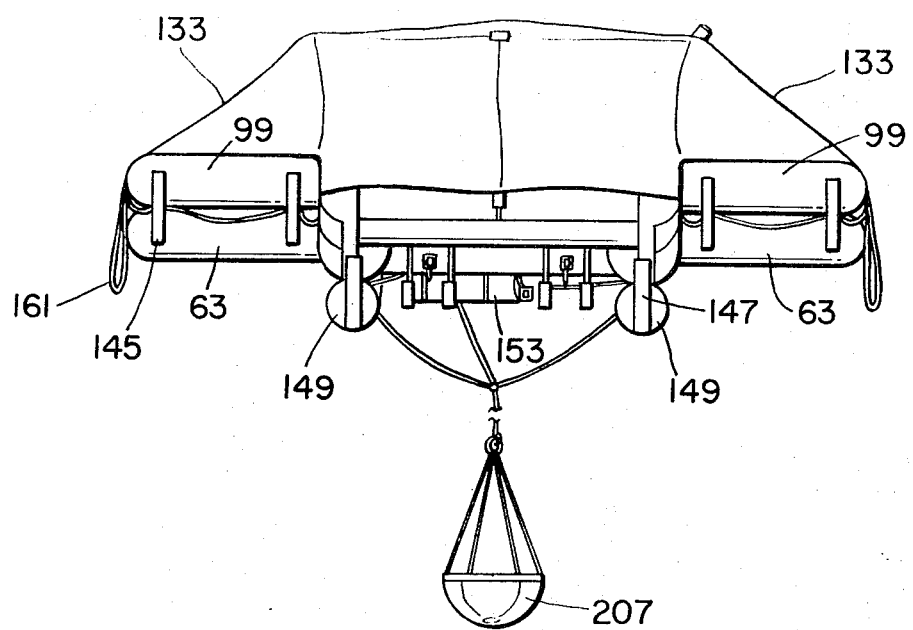
FIG. 10 is an end elevation of the raft, similar to FIG. 4, with the canopy closed and the sea anchor extended.

When the tube assembly 71 is inflated, the canopy is already in a position to be closed quickly and, when the device is to be utilized as a raft, the opposite sides thereof can be attached to enclose the raft as illustrated in FIG. 10. This feature has an additional advantage, however, in that the canopy provides an increased psychological acceptance of the device as a slide for the deplaning passenger or crewmember.

Today's familiarity with air travel, and accidents which have occurred in such travel, clearly illustrates to those skilled in the art that it is imperative that the passengers deplaning under emergency conditions be evacuated as fast as possible. When the average person reaches the door of the plane, he is required to jump onto the slide so that he may descend along its surface until he reaches the ground. The normal person suffers some apprehension when he first sees the slide and his moment of indecision may slow down the deplaning passenger behind him to such an extent that panic may occur at a later time due to a buildup in such delays. This is particularly true with many currently used slides since they are usually formed of a single inflatable tube structure which has a slippery surface material fastened to and supported by the upper plane of the tube structure. Consequently, a person jumping onto the slide tends to feel that if he is not careful he will fall off the slide before he has completely traversed it. In fact, this often happens and deplaning passengers may be further injured. It is well known, for example, that in many emergency landings in which the passengers must be deplaned by slides, the only minor injuries sustained in the entire incident are caued by falling from the slides. Thus, with many currently available slides, the moment of indecision on the part of the passenger is not totally unwarranted.

More recently, and particularly as illustrated in the above-cited application Ser. No. 131,270, the provision of a pair of inflatable tube assemblies having the slide surface fixed between an upper and a lower assembly reduces this moment of indecision since it becomes impossible for the deplaning passenger to fall off the slide due to the "fence" created by the upper tube assembly. This advantage is also present in the device being described here. Additionally, however, the canopy is located so that it extends over the stanchions and creates the psychological concept of a still higher wall on either side of the slide, thereby still further inducing the feeling of security to persons utilizing the slide.

Referring now to FIGS. 2-4, the lower and upper inflatable tube assemblies 31 and 71 are shown in their cooperating positions relative to the complete assembly 25. Although FIG. 3 is illustrated with the device in the horizontal position in which it might be used as a raft, tilting of the paper to an angle of, say 45°, will illustrate the position of a device when utilized as a slide.

The two inflatable tube assemblies may be bonded along their interface and also fastened together by a plurality of tensioning straps 145 suitably positioned at various locations about the periphery. Additionally, a truss strap 147 may be used to connect the front and rear portions of the assembly 25 along either side thereof. Truss supports 149 may be suitably bonded to the tubes 33 and 35 and located to tension the truss straps 147 and thus prevent the passenger support surface of the raft from assuming a concave configuration which would become more and more pronounced as additional people board the raft. The truss supports may be pneumatically connected to the lower inflation tube assembly 31 by means of connection tubes 151 so that the truss supports become inflated simultaneously with the inflation of the assembly 31.

As shown in FIGS. 3 and 4, a compressed gas bottle 153 may be suitably attached to the lower tube assembly 31 and pneumatically connected to the aspirators 47 and 83 (FIG. 2) so that, when the trigger is actuated, air will be delivered to the aspirators to inflate the two assemblies.

In the assembled form illustrated in these three figures, it can be seen that life lines 157 may be suitably fastened to the device. These lines might be used, example, by persons in the water alongside the raft attempting to hang on to it.

Similarly, hand hold and step lines such as illustrated at 159 and 161, respectively, may be provided to allow people in the water to board the raft easily.

In construction, the central portion of the raft may be provided with a slide surface 163 (FIG. 2) which, in the illustrated embodiment, is divided into two separate slide paths or troughs 165 and 167 which are separtated and formed by the central divider tube 45 of the lower inflatable tube assembly 31. Thus, when used as a slide, two passengers can traverse its length simultaneously without bumping into or injuring one another.

Each of the sponsons may be provided with a floor section 169 upon which raft occupants may sit or lie down. The floor sections 169 may be installed between the upper and lower inflatable sponson section tube assemblies. It may be supported by the lower tube assembly similarly to the manner in which the slide surface 163 is fixed between the assemblies and is supported by the lower assembly.

As illustrated in FIG. 2, a girt device 171 having suitable tensioning straps 173 connected to the upper end cross tube 81 may be provided for attaching the slide-raft to the locking bar (not shown) in the aircraft in a well-known manner. In this figure, the head end tube 79 is partially illustrated in its inflated configuration. When this tube is not inflated in the manner previously described, it, and its related stanchions 89, are stored under the girt 171 so that people leaving the aircraft do not stumble over it or damage it.

Suitable storage pockets may be provided in the slide-raft such as illustrated at 181 and 183 for food, etc. For example, the pocket 183 may be used to store a heaving line and a small air pump may be stored as illustrated at 184.

A large number of other, similarly related survival equipment, may also be located aboard the raft, including an emergency locator transmitter antenna 193, sea water-actuated light devices 195, etc., (FIG. 3).

Referring now to FIGS. 8–10, various views of the raft are shown in which the canopy 133 is illustrated as enclosing the raft. The canopy is shown as having closeable openings 201 through which persons in the water may board the raft and air may be allowed to circulate. Openings 201 may be closed, for example, by zippers 202 about the peripheries of the openings. Although in the preferred embodiment the canopy may be sealed to the side tubes 97 of the sponsons, it may be desired that it merely be removably attached thereto so that it may be rolled up and held on the top of the stanchions 87 by means of the attachment loops 131. In this way, additional air may be allowed to circulate through the interior of the raft for the comfort of its occupants. In any event, at any location to which the canopy is not sealed or bonded to the raft, it is preferred that some means be provided to removably attach the canopy thereto so that wind and water may be sealed out of the raft in rough conditions.

In order to support the central section of the canopy, manually inflatable stanchions 205 may be provided. When these stanchions have been inflated, they can be wedged between the central portion of the slide surface as illustrated in FIG. 2 and the interior of the closed canopy in order to support the canopy. To ensure that they remain in place, suitable patches may be formed on the stanchions by means of which they may be tied or otherwise fixed to the interior of the canopy.

As an additional safety and comfort advantage of the present invention, a sea anchor 207 may be suitably attached to the raft assembly 25 and normally stored in a suitable pocket thereon. It will be realized by those skilled in the art that the sea anchor will tend to cause the raft to orient itself so that it is longitudinally parallel to the direction from which the wind is blowing, thereby normally reducing the discomforting effect of rough seas.

These additional features are meant to be exemplary only in order to show the variety of safety and comfort features which can be easily supplied with such devices.

It will now be clearly apparent to those skilled in the art that a wide variety of advantages are presented as a result of the use of a slide-raft formed in accordance with the present invention. Of course, the illustrated and described embodiment is meant to be only exemplary and a large variety of such embodiments will now be apparent to those skilled in the art. Regardless of the selected embodiment, however, a device formed in accordance with the present invention improves chances of surviving because this safety device is immediately available whether it is to be used as a raft or as a slide. When used as a slide, its improved configuration is psychologically advantageous since the deplaning passenger will immediately be aware that there is no likelihood of his falling off the side of the slide. On the other hand, it is fully and immediately utilizable as a raft since it can provide survival gear, shelter, etc., as opposed to the prior art devices which were utilizable only as slides.

The device also reduces the weight which has heretofore been required by separate and individual rafts and slides. Similarly, the logistics problems of supplying the safety devices and making them ready for use aboard the airplane are reduced, as is the total cost thereof. The total volume of such a device is approximately 60 percent smaller than the combined volumes of the prior art slides and rafts as used aboard aircraft. Also eliminated is the necessity of storing the raft in the aircraft overhead, with its attendant problems of procurement and use during an emergency. Additonally, the useful load of the aircraft in passengers and baggage is increased slightly since the total weight of such survival equipment is reduced by the invention. For example, many prior art rafts, alone, weighed as much as 120–200 pounds and that figure does not include the weight of a separate slide. On the other hand, the weight of a slide-raft formed in accordance with the present invention normally will not exceed 190 pounds in the largest configurations thereof.

However, there is still one further advantage of these devices which is very important to the carriers utilizing them since it directly affects their economic return. That is that the provision of the safety device as a single unit which is readily available immediately upon opening the door of the aircraft increases the number of passengers that can be deplaned within a predetermined period of time. Consequently, the number of seats which can be placed aboard the aircraft may be increased, within weight and balance limitations, thereby increasing the economic return to the carrier for flights in which the aircraft is filled.

It will now be realized by those skilled in the art that the present invention produces a large number of valuable advantages, providing a real advance in the art of survival equipment. Many alternate embodiments and derivations thereof will be apparent to those skilled in the art without avoiding the scope of the present invention which shall be delineated only by the following claims wherein:

We claim:

1. An emergency aircraft escape slide/raft for use on land or water comprising
    a first inflatable tube structure extending in inflated relationship from the emergency escape in the aircraft to a position adjacent the land or water,
    a second inflatable tube structure physically attached to the first inflatable tube structure at a position adjacent to the emergency escape in the aircraft but pneumatically independent of said first tube structure,
    a slide surface located at one end at substantially the interface of said first and second inflatable tube structures and supported by the first inflatable tube structure along the length of the first inflatable tube structure, the slide surface providing a support surface on which persons may slide when evacuating an aircraft,
    inflatable stanchions integral with said first inflatable tube structure and in pneumatic communication therewith,
    a flexible canopy means fastened to said first inflatable tube structure and extending over the inflatable stanchions to define the canopy,
    means operably coupled to the first inflatable tube structure to provide for an inflation of the first inflatable tube structure when an emergency escape from the aircraft is to be provided.
    means for providing for the detachment of the slide/raft from the aircraft after the evacuation of passengers from the aircraft, and
    means operatively coupled to the second inflatable tube structure for inflating the second inflatable tube structure after the evacuation of the passengers from the aircraft to define with the first inflatable tube structure a raft having side walls around the periphery of the raft.

2. The escape device of claim 1 including
    means for retaining said canopy means in an opened position wherein said slide surface is uncovered and
    means for supporting said canopy in a closed position wherein said slide surface is covered.

3. The escape device of claim 1 including
    inflatable sponson sections in pneumatic communication with said first tube structure and disposed laterally outwardly from said tube, and
    floor means extending between said first inflatable tube structure and said sponson sections, said floor means providing surfaces upon which persons may be supported after evacuation from an aircraft.

4. The device of claim 1 wherein the inflating means for the second inflatable tube structure includes:
    means in one of said first and second tube structures for preventing air flow from the first inflatable tube structure to the second inflatable tube structure during inflation of the first inflatable tube structure, and
    means for selectively providing an air flow path from the first inflatable tube structure past said air flow preventing means to the second inflatable tube structure when desirable to inflate said second inflatable tube structure.

5. The device of claim 1 wherein said canopy means includes
    access openings at predetermined locations about the periphery thereof and
    means for selectively effecting closure of said access openings to prevent passage of air and water therethrough.

6. The device of claim 1 including
    means attached to said first tube structure for inhibiting concavity produced in said slide surface by the cumulative weight of passengers.

7. A safety device which may be utilized as a personnel slide and as a raft for an aircraft comprising
    a lower inflatable flotation tube assembly,
    first means operatively coupled to said lower inflatable tube assembly for inflating said lower tube assembly,
    an upper inflatable flotation tube assembly mounted on said lower tube assembly and pneumatically distinct therefrom,
    second means operatively coupled to said upper inflatable tube assembly for inflating said upper tube assembly,
    personnel support means suspended between said lower and upper tube assemblies,
    inflatable stanchion means in pneumatic communication with said upper tube assembly,
    first inflatable sponsons pneumatically associated with the lower inflatable tube assembly for inflation with the lower inflatable tube assembly and disposed exteriorly of the lower inflatable tube assembly in the inflated condition,
    second inflatable sponsons pneumatically associated with the upper inflatable tube assembly for inflation with the upper inflatable tube assembly and disposed exteriorly of the upper inflatable tube assembly and disposed exteriorly of the upper inflatable tube assembly in the inflated condition,
    means defining walking surfaces between the first inflatable tube assembly and the first inflatable sponsons and between the second inflatable tube assembly and the second inflatable sponsons, and
    enclosure means supported by said stanchion means and said first and second inflatable sponsons to removably enclose the space intermediate opposed sides and ends of said first and second inflatable sponsons and said personnel support means and walking surface means.

8. The device of claim 7 including
means disposed at one end of the upper flotation tube assembly for preventing the inflation of said one end of said upper inflatable tube assembly by said second inflating means and
means operative upon the inflation of the upper flotation tube assembly for providing for a withdrawal of a portion of the air from said upper inflatable tube assembly and delivering it to the non-inflated one end thereof to thereby inflate said one end when desired to close off said personnel support means for use as a raft.

9. The device of claim 8 wherein
said air-withdrawing means is disposed within the upper inflatable tube assembly and is operated from a position external to said upper inflatable tube assembly.

10. The device of claim 9 including
detachable stanchion means, each independently inflatable, for supporting said enclosure means at approximately the center of said personnel support means when said enclosure means is closed thereover.

11. An emergency evacuation device releasably attachable to an aircraft at an exit thereof comprising
an elongated slide means including
a first inflatable tube assembly comprising
a pair of side tubes,
an upper end tube extending between the side tubes in fluid communication with the side tubes,
lower end tube extending between the side tubes in fluid communication with the side tubes,
at least one cross support tube disposed at an intermediate position between the upper and lower end tubes and in fluid communication with the side tubes, and
a slide divider tube disposed between the side tubes and in fluid communication with the side tubes,
slide surface means located at substantially the upper periphery of said first tube assembly and divided into distinct slide paths by said divider tube,
a second inflatable tube assembly mounted on said first tube assembly and comprising
a pair of side tubes forming side walls for said slide surface means,
a bottom end tube disposed for support on the ground or on water when the device is used as a slide, the bottom end tube being disposed in fluid communication with the pair of side tubes in the second inflatable tube assembly, and
a head end tube for closing one end of the second inflatable tube assembly when the device is used as a raft,
means for inflating said first and second tube assemblies,
means operatively coupled to the head end tube in the second inflatable tube assembly for preventing inflation of said head end tube of said second tube assembly when said pair of side tubes and said bottom end tube in said second inflatable tube assembly are being inflated, and
means operatively coupled to the head end tube in the second inflatable tube assembly for providing for inflation of said head end tube after the inflation of the side tubes and the bottom end tube in the second inflatable tube assembly.

12. The device of claim 11 including
inflatable sponson means disposed externally of the side tubes in the first inflatable tube assembly and the side tubes in the second inflatble tube assembly and in pneumatic communication with the side tubes in the first and second inflatable tube assemblies and extending to either side of said slide means and including
flexible flooring therein for support of personnel thereon when said device is detached from an aircraft and used as a raft.

13. The device of claim 12 including
canopy means extending over the first and second inflatable tube assemblies and the inflatable sponson means and attachable to the inflatable sponson means for enclosing said slide surface and said flexible flooring for protection of personnel thereon from exposure.

14. The device of claim 11 including
means operatively coupled to the head end tube and the second inflatable tube assembly for operating upon the inflation-preventing means to provide for a withdrawal of a portion of the air from said second tube assembly and an inflation of said head end tube with the air.

15. The device of claim 14 wherein
the means for providing for the withdrawal of air from the second inflatable tube assembly to the head end tube is manipulatable from a position external to the second inflatable tube assembly and the head end tube.

16. The device of claim 11 including
truss means fixed to said first tube assembly for preventing concavity of said slide surface.

17. An evacuation device for evacuating passengers from an airplane comprising
upper and lower pneumatically distinct inflatable tube assemblies,
means operatively coupled to the upper and lower inflatable tube assemblies for providing for the inflation of such tube assemblies,
a slide surface located between said tube assemblies for support of an evacuee sliding therealong,
means pneumatically separating a portion of said upper tube assembly from the remainder of said upper tube assembly at the position of evacuation of the passengers from the aircraft, and
means operatively coupled to said last mentioned means for providing for a pneumatic communication between said separated portion and said remainder of said upper tube assembly.

18. An evacuation device for evacuating passengers from an airplane comprising
an upper inflatable tube assembly including
inflatable sponson means in pneumatic communication therewith,
means operatively coupled to the upper inflatable tube assembly for providing for the inflation of such inflatable tube assembly,
a lower inflatable tube assembly including
inflatable sponson means in pneumatic communication therewith,
means operatively coupled to the lower inflatable tube assembly for providing for the inflation of such inflatable tube assembly, floor means fixed between said upper and lower inflatable tube assemblies and supported by said lower tube assembly, stanchion means in pneumatic communication with said upper tube assembly, canopy means fixed to said upper tube assembly and extending over and supported by said stanchion means, and means operatively coupled to the upper tube assembly for providing for uninhibited evacuation of passengers from the aircraft on the floor means and for providing for the production of barriers against the movement of the passengers from the upper tube assembly after the evacuation of the passengers to convert the evacuation device into a raft.

19. The device of claim 18 wherein
said sponson means are located on each side of said upper and lower inflatable tube assemblies and
that portion of said floor means disposed within said inflatable tube assemblies comprises
a slide surface along which personnel may traverse said device when said device is utilized as a slide and upon which personnel may be supported when said device is utilized as a raft.

20. Apparatus for use as a slide for evacuation of a vehicle and thereafter for use as a raft comprising
an upper inflatable tube assembly,
a lower inflatable tube assembly,
means operatively coupled to the upper and lower inflatable tube assemblies for providing for inflation of said tube assemblies,
a surface supported between said upper and lower tube assembly for use initially as a slide surface for evacuation from the vehicle and for use thereafter as a walking surface from the raft,
means for blocking at least the end of said upper inflatable tube assembly adjacent to the vehicle from inflation during use as a slide, and
means operatively coupled to the upper inflatable tube assembly for providing for the inflation of the uninflated and of the upper inflatable tube assembly during use as a raft.

21. A combination of claim 20 wherein said upper and lower tube assembly are pneumatically distinct and each includes
means for inflation thereof and wherein
said blocking means comprises
bulkhead means for segregating a distinct portion of said upper inflatable tube assembly adjacent to the position of evacuation from the vehicle and said inflatable means for said distinct portion of said upper inflatable tube assembly includes
means for transferring air from said upper inflatable tube assembly to said distinct portion to selectively equalize the air pressure between said distinct portion and the remainder of said upper inflatable tube assembly.

22. The device of claim 18 wherein
the last mentioned means includes means for preventing the inflation of the end of the upper tube assembly adjacent to the aircraft during the use of the evacuation device as a slide for evacuating passengers from the aircraft and further includes means for providing for the withdrawal of air from the upper tube assembly to the uninflated end of the tube assembly for operation of the evacuation device as a raft.

23. The device of claim 22 wherein the
last mentioned means includes means operable from a position external to the upper tube assembly to provide for the withdrawal of air from the upper tube assembly to the uninflated end of the tube assembly for operation of the evacuation device as a raft.

24. A safety device which may be utilized as a personnel slide and as a raft for an aircraft, comprising
a lower inflatable flotation tube assembly,
first means operatively coupled to said lower inflatable tube assembly for providing for the inflation of said lower inflatable tube assembly,
an upper inflatable flotation tube assembly mounted on said inflatable tube assembly and pneumatically distinct from said lower inflatable tube assembly,
second means operatively coupled to said upper inflatable tube assembly for providing for the inflation of said upper inflatable tube assembly,
third means supported between the upper and lower inflatable tube assemblies for providing a slide surface during the evacuation of the personnel from the aircraft and for thereafter providing a support surface for the personnel during use as a raft,
inflatable stanchions extending upwardly from the upper inflatable tube assembly in fluid communication with the upper inflatable tube assembly to be inflated at the same time as the upper inflatable tube assembly, and
canopy means supported by the stanchions and extending over the upper inflatable tube assembly to provide a cover for the personnel during use as a raft.

25. A safety device as set forth in claim 24, including lower inflatable sponson assemblies extending laterally outwardly from the lower inflatable tube assembly in fluid communication with the lower inflatable tube assembly,
upper inflatable sponson assemblies extending laterally outwardly from the upper inflatable tube assembly in fluid communication with the upper inflatable tube assembly, and
fourth means supported between the upper and lower inflatable sponson assemblies and constituting an extension of the third means for providing a further support surface for the personnel during use as a raft,
the canopy means also extending over the upper inflatable sponson assemblies.

26. A safety device as set forth in claim 25, including means disposed on a particular one of the upper and lower inflatable sponson assemblies for securing the canopy means.

27. A safety device as set forth in claim 25, wherein the upper inflatable tube assembly does not initially inflate along a particular wall adjacent to the aircraft during use as a slide and wherein means are provided for inflating the particular wall of the upper inflatable tube assembly for use as a raft.

* * * * *